United States Patent

Shimomura et al.

[11] Patent Number: 5,107,915
[45] Date of Patent: Apr. 28, 1992

[54] PNEUMATIC TIRE FOR PASSENGER CAR

[75] Inventors: Iwao Shimomura; Shigeki Narahashi, both of Hiratsuka, Japan

[73] Assignee: The Yokohama Rubber Co., Ltd., Tokyo, Japan

[21] Appl. No.: 595,137

[22] Filed: Oct. 10, 1990

[30] Foreign Application Priority Data

Oct. 11, 1989 [JP] Japan .................. 1-262902

[51] Int. Cl.$^5$ .................. B60C 15/02; B60C 15/06
[52] U.S. Cl. .................. 152/543; 152/544; 152/546; 152/547
[58] Field of Search .............. 152/539, 543, 546, 547, 152/555, 542, 544, 510

[56] References Cited

U.S. PATENT DOCUMENTS

| | | | |
|---|---|---|---|
| 2,888,058 | 5/1959 | Manis et al. | 152/543 |
| 3,921,693 | 11/1975 | Suzuki et al. | 152/543 |
| 4,917,164 | 4/1990 | Ushikubo et al. | 152/544 |
| 5,058,649 | 10/1991 | Hoang et al. | 152/543 |

FOREIGN PATENT DOCUMENTS

| | | | |
|---|---|---|---|
| 0182978 | 6/1986 | European Pat. Off. | 152/547 |
| 0183207 | 9/1985 | Japan | 152/539 |
| 0237205 | 9/1989 | Japan | 152/539 |
| 2171308 | 7/1990 | Japan | 152/539 |
| 2179515 | 7/1990 | Japan | 152/539 |

OTHER PUBLICATIONS

"Rubber Technology and Manufacture"; p. 134; Editor C. M. Blow; 1975.

Primary Examiner—Michael W. Ball
Assistant Examiner—Nancy T. Krawczyk
Attorney, Agent, or Firm—Armstrong, Nikaido, Marmelstein, Kubovcik & Murray

[57] ABSTRACT

A pneumatic tire for a passenger car characterized in that a rubber chafer around bead portions is composed of a laminate member consisting of a soft rubber layer which is at least 0.2 mm thick and a hard rubber layer which is thicker than the soft rubber layer, the soft rubber layer being made of a rubber having a JIS hardness Hs of 50 to 65, a complex elastic modulus E* of at least 3.0 MPa and a compression set of up to 25% and disposed outside, and the hard rubber layer being made of a rubber having a JIS hardness Hs of 70 to 85, a complex elastic modulus E* of at least 6.0 MPa and a compression set of up to 32% and disposed inside.

5 Claims, 2 Drawing Sheets

PNEUMATIC TIRE FOR PASSENGER CAR

BACKGROUND OF THE INVENTION

This invention relates to a pneumatic tire for a passenger car, particularly of a radial structure, having improved rim clamping force, rim fittability and fittedness.

The structure of that portion of a pneumatic tire for a passenger car (hereinafter referred to merely as the "tire") around the bead portion influences important tire characteristics such as clamping force to a rim, fittability, fittedness and so forth. A chafer is disposed around the bead portions of the tire in order to improve these characteristics.

Conventionally, a fabric chafer reinforced by fiber cords and a rubber chafer made solely of rubber are available as the chafer described above. In the case of the fabric chafer, however, a non-uniform portion with a large rigidity occurs in such a manner as to cross transversely the tire circumferential direction due to mutual splice of the raw material sheet end portions that occurs at the time of tire molding, so that rim fittability gets deteriorated and fittedness is inferior. The rubber chafer causes the problems in that the shape is unstable, the rim clamping force is not sufficient and rim deviation and rim fall-off are likely to occur.

SUMMARY OF THE INVENTION

It is an object of the present invention to provide a pneumatic tire for a passenger car which keeps the advantages of both fabric chafer and rubber chafer of conventional tires, reduces their drawbacks and is excellent in all the aspects of rim clamping force, rim fittability and fittedness to the rim.

To accomplish the object described above, that portion of the tire in accordance with the present invention around the bead portion is composed of a rubber chafer having a two-layered structure consisting of a soft rubber layer on an outer layer side and a hard rubber layer on an inner layer side. Further, the soft rubber layer is at least 0.2 mm thick and is made of a rubber having a JIS hardness Hs of 50 to 65, a complex elastic modulus $E^*$ of at least 3.0 MPa and a compression set of up to 25%. In contrast, the hard rubber layer is thicker than the soft rubber layer and is made of a rubber having JIS hardness Hs of 70 to 85, a complex elastic modulus $E^*$ of at least 6.0 MPa and a compression set of up to 32%.

As described above, the chafer around the bead portion is composed of the two-layered laminate member of the soft and hard rubber layers having mutually different values of the JIS hardness Hs, complex elastic modulus $E^*$, compression set and thickness and the soft rubber layer is disposed on the surface side of the bead portion. In this manner, smooth fitting can be made at the time of rim assembly without rubber crack and rim fittability can be improved. After the rim assembly is completed, the tire of this invention reduces rim deviation and rim fall-off and can improve fittedness. Since a high rim clamping force can be obtained by the hard rubber layer, rim deviation can be reliably prevented after the rim assembly even if fitting to the rim is not sufficient at an early stage of the rim assembly. Furthermore, since fittedness after the rim assembly is thus high, rim deviation cannot take place so easily even when the rim clamping force drops from the initial level.

In the present invention, the JIS hardness Hs and the compression set (compressive permanent strain) are values which are measured in accordance with the method stipulated in JIS-K 6301. However, the HIS hardness Hs is the value when measured at 20° C. by a JIS spring hardness teser, while the compression set means ratios of permanent compression set measured after a heat treatment in a thermostatic oven at 70° C. for 22 hours under application of a 25% compression. The term "complex elastic modulus $E^*$" represents the value measured under the conditions of a temperature of 20° C., a frequency of 20 Hz, a stretch ratio of $10\pm2\%$ and sample width $\times$ thickness of 5 mm $\times$ 2 mm by use of a stretch type viscoelastic tester "rheograph solid" produced by Toyo Seiki K.K.

DETAILED DESCRIPTION OF THE PREFERRED EMBODIMENTS

Figure 1:
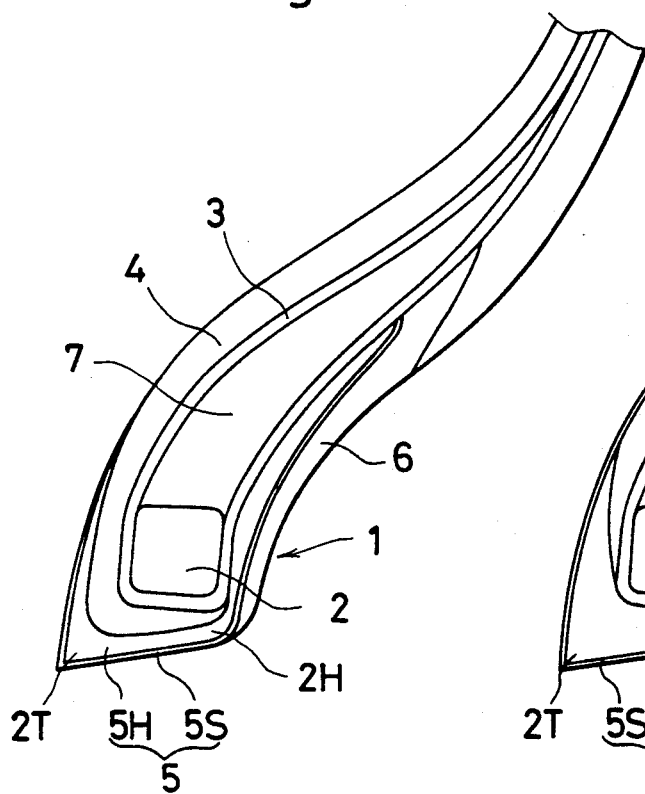
FIG. 1 is a partial sectional view showing the structure of a bead portion of a tire in accordance with the present invention.

FIG. 1 shows a bead portion 1 of a tire having a radial structure in accordance with the present invention though its tread portion is omitted from the drawing. A bead core 2 is embedded in the bead portion 1 and a bead filler 7 is disposed above it. A carcass layer 3 is turned up from inside to outside the tire in such a manner as to wrap the bead filler 7 around the bead core 2 and its end is turned up to the sidewall. An inner liner layer 4 is disposed along the inside of the carcass layer 3 and extends up to a region of a bead heel portion 2H of the bead core 2 from inside the tire. The inner layer 4 around the bead core 2 is covered with a rubber chafer 5 and the end of this rubber layer 5 extends down to the lower region of the sidewall of the outside of the tire. A rim cushion layer 6 is disposed outside the rubber chafer 5 in such a manner as to extend from the bead heel portion 2H to the sidewall.

The rubber chafer 5 described above consists of a laminate of a hard rubber layer 5H on the inner layer side and a soft rubber layer 5S on the outer layer side. The soft rubber layer on the outer layer side is at least 0.2 mm thick and is made of a rubber having a JIS hardness Hs of 50 to 65, a complex elastic modulus $E^*$ of at least 3.0 MPa and preferably from 3.5 to 5.0 MPa, and a compression set of up to 25%. The hard rubber layer 5H on the inner layer side is thicker than the soft rubber layer 5S and is made of a rubber having JIS hardness Hs of 70 to 85, a complex elastic modulus $E^*$ of at least 6.0 MPa and preferably from 6.5 to 9.0 MPa, and a compression set of up to 32%.

The rubber chafer 5 having the structure described above has the soft rubber layer 5S disposed on the surface side of the bead portion so that the soft rubber layer 5S comes into direct contact with the rim. This prevents rubber crack at the time of rim assembly of the tire and improves fittability. At the same time, the fittedness of the tire to the rim after rim assembly can be improved, a rim deviation can be prevented and a good air sealability can be secured.

If the JIS hardness Hs of the soft rubber layer 5S is less than 50, the rubber strength drops and durability gets deteriorated. If the JIS hardness Hs exceeds 65 which is substantially the lower limit of a conventional rubber chafer, only rim deviation resistance which is equal to that of a conventional tire equipped with a single layer rubber chafer can be obtained. Further, if the thickness of the soft rubber layer 5S is less than 0.2 mm, good rim fittability and fittedness cannot be provided.

Besides, when the hard rubber layer 5H is disposed on the inner layer side, it secures the rim clamping force of the bead portion after the rim assembly is made, so that rim deviation and rim fall-off do not occur so easily and air sealability can be improved. Moreover, even if the soft rubber layer 5S on the outer layer side gets fatigued, the clamping force to the rim can be secured by this hard rubber layer 5H for an extended period.

If the JIS hardness Hs of the hard rubber layer 5H is less than 70, the rim clamping force cannot be secured sufficiently and rim deviation resistance and rim fall-off resistance cannot be satisfied. If the JIS hardness Hs exceeds 85, rim assembling property gets deteriorated and inferior fitting will occur. Unless the hard rubber layer 5H is thicker than the soft rubber layer 5S, good rib clamping force described above cannot be obtained and rim deviation resistance as well as air sealability drop.

The rubber composition constituting the soft and hard rubber layers is not particularly limiting so long as the required characteristics such as the JIS hardness Hs, the complex elastic modulus $E^*$ and the compression set are satisfied. Preferably, however, the rubber composition can be obtained by adjusting the blend quatities of blending agents such as vulcanization adjuvants, antioxidants, etc., typified by carbon black, sulfur, vulcanization promoters, etc., to the rubber components such as natural rubber, styrene-butadiene copolymer rubber (SBR), butyl rubber (BR) and polyisoprene rubber (IR).

Figure 2:
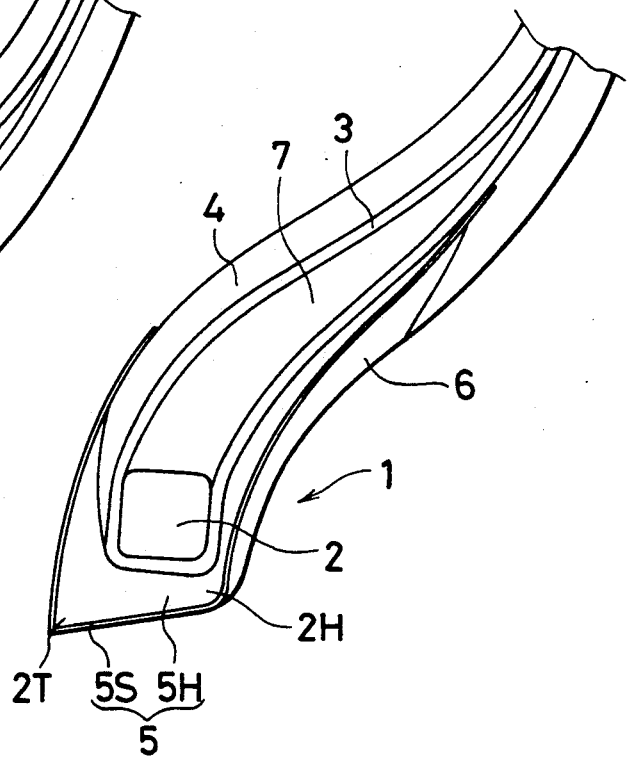
FIG. 2 is a partial sectional view showing the structure of the bead portion of a tire in accordance with another embodiment of the present invention.

In the tire of the present invention, the rubber chafer 5 and the bead core 2 may be disposed in such a manner as to come into direct contact with each other as shown in FIG. 2 instead of the arrangement of the embodiment shown in FIG. 1 wherein the inner liner layer 4 is disposed in the region from the bead toe portion 2T to the bead heel portion 2H. Though the rubber chafer 5 may be disposed in a wide region extending to the sidewall portion by turning it back from inside to outside the tire around the bead core 2 as shown in FIG. 2, it is sufficient if at least the portion which comes into contact with the rim is covered.

In the case of the embodiment shown in the drawings, the soft rubber layer 5S and the hard rubber layer 5H form the complete layers throughout the entire region of the rubber chafer 5 but the structure consisting of only either one of them may be employed in its end region.

EXAMPLE 1

The following three kinds of radial tires were produced, which had a same tire size of 185/60R14.

Tire of this Invention

It had a bead structure shown in FIG. 1, its soft and hard rubber layers consisted of the rubber compositions having the blend compositions shown in Table 1 and were made of a rubber having the JIS hardness Hs, complex elastic modulus $E^*$ and compression set shown in Table 1.

Conventional Tire I

It was the tire obtained by replacing the rubber chafer of the tire structure of the Tire of This Invention by a fabric chafer.

Conventional Tire II

It was the tire obtained by replacing the rubber chafer of the tire structure of the Tire of This Invention by a single layer structure and its chafer consisted of the blend composition shown in Table 1 and had the JIS hardness Hs, complex elastic modulus $E^*$ and compression set shown in Table 1.

TABLE 1

|  | Tire of This Invention | | Conventional Tire II |
|---|---|---|---|
|  | soft rubber | hard rubber |  |
| Blended Agents (parts by weight) |  |  |  |
| NR/SBR | 60/40 | 60/40 | 60/40 |
| carbon black | 50 | 80 | 60 |
| zinc white | 2.0 | 2.0 | 2.0 |
| process oil | 7.0 | 10.0 | 7.0 |
| stearic acid | 2.0 | 4.0 | 2.0 |
| antioxidant | 0.5 | 0.5 | 0.5 |
| sulfur | 2.70 | 2.85 | 2.70 |
| JIS hardness Hs | 55 | 74 | 68 |
| complex elastic modulus $E^*$ | 3.5 | 8.0 | 6.5 |
| compression set (%) | 22.0 | 32.0 | 28.0 |

Rim clamping force, rim fittability and fittedness to the rim of these three kinds of tires were measured by the method to be described below. Rim deviation resistance and rim fall-off resistance of these tires when they were fitted to actual cars were evaluated. The results are tabulated in Table 2.

Rim Clamping Force

After each tire was assembled to a normal rim at an air pressure of 3.5 kgf/cm$^2$, it was left at room temperature of 80° C. The degree of the drop of the rim clamping force was measured every predetermined time by use of a fitting force measuring instrument produced by Hoffman Co.

Rim Fittability

Ease of fittability of the tire bead portion of each tire to the rim when it was assembled to a normal rim was evaluated by feeling.

Rim Fittedness

Figure 4:
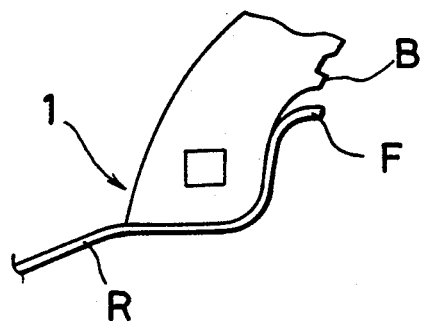
FIGS. 4 and 5 are explanatory views, each showing the evaluation method of fittedness to a rim.
Figure 5:
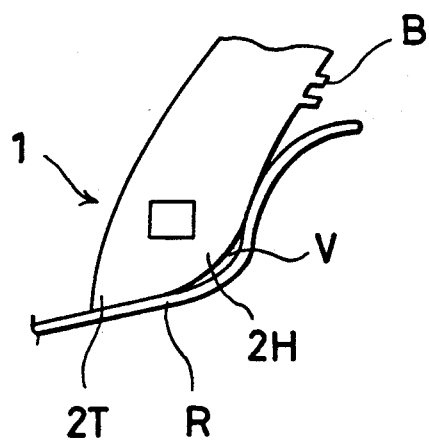

After each tire was assembled to a normal rim, this parameter was evaluated by measuring uniformity of the gap between the rim flange F of the rim R and the mounting bar (rim check line) B of the tire bead portion 1 in the tire circumferential direction as shown in FIG. 4 and the degree of the gap V between the rim R and the heel portion 2H of the tire bead portion 1 in the tire circumferential direction as shown in FIG. 5.

Rim Deviation Resistance

The tires of each kind were fitted to normal rims and after normal air pressure was charged, they were mounted to an actual fully loaded car. Braking of a negative acceleration 0.8 G from a speed of 50 km/hr was repeated 20 times and the rim deviation quantity of the tires was measured.

The evaluation results are represented by indexes by using the reciprocals of the measured values and taking the evaluation value found of the Conventional Tire I as 100. The greater this value, the more excellent the rim deviation resistance.

Rim Fall-off Resistance

The tires of each kind fitted to the normal rims were mounted to an actual car so that a load of 80% of the JIS design normal load was applied. When the car was driven on a circle course having a radius of 25 m at a speed of 60 km/hr, the air pressure was sequentially reduced by 0.1 kgf/cm² and the fall-off resistance was evaluated by the air pressure at the time when the rim fell off. The evaluation results are represented by indexes by taking the reciprocals of the measured air pressure and by taking the evaluation value found of the Conventional Tire I as 100. The greater this value, the more excellent the rim fall-off resistance.

TABLE 2

|  | Tire of This Invention | Conventional Tire I | Conventional Tire II |
| --- | --- | --- | --- |
| rim fittability | easy | difficult | easy |
| rim fittedness | good | bad | good |
| rim deviation resistance | 100 | 100 | 70 |
| rim fall-off resistance | 100 | 100 | 90 |

As can be seen from Table 2, the Tire of This Invention had excellent rim fittability and rim fittedness and kept substantially equal rim deviation resistance and rim fall-off resistance to those of the Conventional Tire I using the fabric chafer. The Conventional Tire II which used only a single layer rubber chafer had good fittability and fittedness but its rim deviation resistance and rim fall-off resistance when mounted to the actual car were inferior.

EXAMPLE 2

Figure 3:
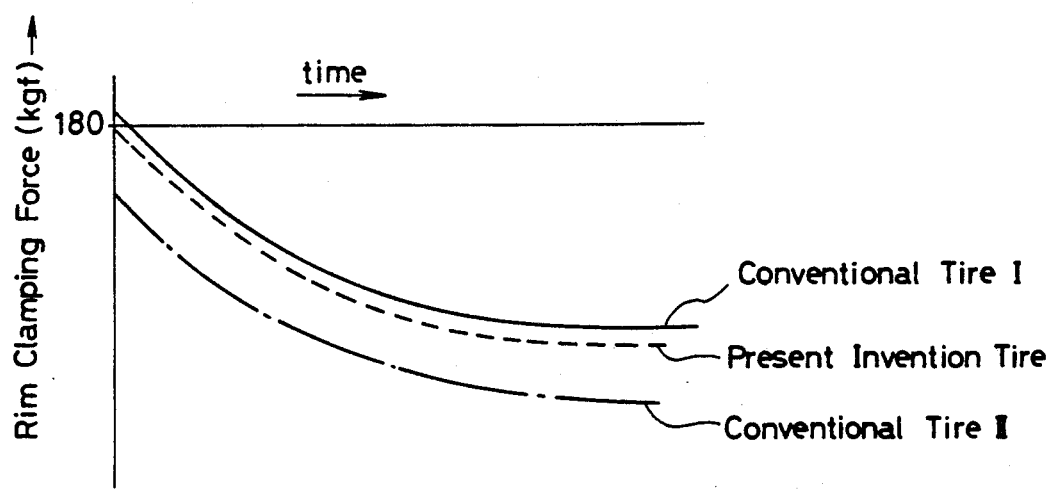
FIG. 3 is a diagram showing the change of a rim clamping force of the tire with time.

FIG. 3 shows the result of examination of the change of the rim clamping force with the time when the three kinds of tires produced in Example 1 were fitted to the rims by the rim clamping force of 180 kgf.

As is obvious from FIG. 3, the Tire of this Invention exhibited substantially the same change with time of rim clamping force as that of the Conventional Tire I equipped with the fabric chafer but the change of the rim clamping force with time of the Conventional Tire II was extremely great.

What is claimed is:

1. A pneumatic tire for a passenger car wherein the improvement comprises: a rubber chafer disposed around a bead portion so as to extend from at least a bead toe portion to at least a bead heel portion, said rubber chafer is composed of a soft rubber layer on an outer layer side and a hard rubber layer on an inner layer side, said soft rubber layer is at least 0.2 mm thick and is made of a rubber having a JIS hardness Hs of 50 to 65, a complex elastic modulus $E^*$ of at least 3.0 MPa and a compression set of up to 25%, and said hard rubber layer is thicker than said soft rubber layer and is made of a rubber having a JIS hardness Hs of 70 to 85, a complex elastic modulus $E^*$ of at least 6.0 MPa and a compression set of up to 32%, said complex elastic modulus values $E^*$ being measured at a temperature of 20° C., a frequency of 20 Hz and a ratio of 10±2%, and said compression set being measured after a heat treatment at a temperature of 70° C.

2. A pneumatic tire according to claim 1, wherein said rubber chafer is disposed around the bead core so as to extend from inside said tire to the external sidewall portion through a bead base.

3. A pneumatic tire according to claim 1, wherein an inner liner layer is interposed between said rubber chafer and said bead core.

4. A pneumatic tire according to claim 1, wherein said soft rubber layer is made of a rubber having a JIS hardness Hs of 50 to 65, a complex elastic modulus $E^*$ of 3.5 to 5.0 MPa and a compression set of up to 25%.

5. A pneumatic tire according to claim 1, wherein said hard rubber layer is made of a rubber having a JIS hardness Hs of 70 to 85, a complex elastic modulus $E^*$ of 6.5 to 9.0 MPa and a compression set of up to 32%.

* * * * *